(12) United States Patent
Saito et al.

(10) Patent No.: US 6,897,988 B1
(45) Date of Patent: May 24, 2005

(54) IMAGE PROCESSING APPARATUS, IMAGE PROCESSING METHOD, AND STORAGE MEDIUM FOR COLOR MATCHING

(75) Inventors: Kazuhiro Saito, Yokohama (JP); Takeshi Makita, Kawasaki (JP); Hirochika Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 09/624,376

(22) Filed: Jul. 27, 2000

(30) Foreign Application Priority Data

Jul. 28, 1999 (JP) .......................................... 11-213795

(51) Int. Cl.[7] ............................................... H04N 1/46
(52) U.S. Cl. ........................ 358/515; 358/1.9; 358/505; 358/523
(58) Field of Search ........................ 358/515, 1.8, 505, 358/523, 1.13, 1.15, 518, 525, 522, 1.9, 500; 382/167

(56) References Cited

U.S. PATENT DOCUMENTS

| | | | | |
|---|---|---|---|---|
| 4,751,535 A | * | 6/1988 | Myers | 347/115 |
| 5,510,910 A | * | 4/1996 | Bockman et al. | 358/502 |
| 5,546,195 A | * | 8/1996 | Arai | 358/518 |
| 5,604,566 A | * | 2/1997 | Mano et al. | 355/70 |
| 5,668,890 A | * | 9/1997 | Winkelman | 382/167 |
| 5,767,980 A | * | 6/1998 | Wang et al. | 358/475 |
| 5,838,333 A | * | 11/1998 | Matsuo | 345/604 |
| 5,875,260 A | | 2/1999 | Ohta | 382/162 |
| 5,933,252 A | | 8/1999 | Emori et al. | 358/500 |
| 5,949,427 A | | 9/1999 | Nishikawa et al. | 345/431 |
| 6,257,693 B1 | * | 7/2001 | Miller et al. | 347/19 |
| 6,549,654 B1 | * | 4/2003 | Kumada | 382/162 |
| 6,608,927 B1 | | 8/2003 | Ohta | 382/167 |

FOREIGN PATENT DOCUMENTS

JP 405330148 * 12/1993

* cited by examiner

*Primary Examiner*—Edward Coles
*Assistant Examiner*—Heather D. Gibbs
(74) *Attorney, Agent, or Firm*—Fitzpatrick, Cella, Harper & Scinto

(57) ABSTRACT

An image processing apparatus comprises a color matching processing unit for performing color matching processing according to color reproduction characteristics of input and output devices, a color separation unit for separating image data subjected to the color matching processing, into color components corresponding to recording agents used by the output device, and a control means for controlling a method of the color matching processing and a method of the image data separation, according to a kind of input image. Thus, it is possible to perform the color matching processing and the color component separation according to the kind of input image, thereby realizing the color matching in consideration of how to use the recording agents and the satisfactory color matching according to a human's sight characteristic.

17 Claims, 14 Drawing Sheets

IMAGE PROCESSING APPARATUS, IMAGE PROCESSING METHOD, AND STORAGE MEDIUM FOR COLOR MATCHING

BACKGROUND OF THE INVENTION

1. Field of the Invention

The present invention relates to image processing apparatus and method which perform processing concerning color matching, and a storage medium.

2. Related Background Art

A color matching method is the method to match tints of two devices (e.g., a monitor and a color printer each having a different color reproduction range) with each other. When the color reproduction range of the monitor is compared with the color reproduction range of the color printer, the color reproduction range of the monitor is generally wider than the color reproduction range of a printing output by the color printer, whereby a part of colors represented by the monitor can not be reproduced by the printer.

Thus, various methods to realize color matching between the monitor and the color printer are designed. Concretely, in these methods, in a device-independent uniform color space such as CIE-L*a*b* color system, color gamut mapping (or color space compression) to the color reproduced by the monitor is performed to obtain the color reproducible by the printer, thereby realizing the color matching between the monitor and the color printer.

As a conventional color matching method, there is designed a method which performs compression processing without dislocating hue angles as shown in FIG. 18, a method which performs compression processing at equal value (lightness) as shown in FIG. 19, and a method which performs compression processing toward one specific point on an achromatic color axis as shown in FIG. 20, or the like.

In an actual processing system, when image data is subjected to color gamut mapping pixel by pixel, an enormous processing time is necessary. Thus, a multidimensional table in which only representative points were subjected to the color gamut mapping is previously generated, and colors at points other than the representative points are subjected to color processing according to multidimensional interpolation processing.

However, in the above conventional case, since the color matching is performed in the device-independent L*a*b* color space, it is impossible to realize color matching in consideration of how to use inks dependent on a printer (device).

Further, in such the conventional color gamut mapping as shown in FIG. 18, in the case where the compression is performed without dislocating the hue angles in an a*b* plane, since the uniform color space such as the L*a b* color space does not completely reflect a human's sight characteristic, there is a problem that an appeared tint rather changes because the compression is performed without dislocating the hue angle. As to value (lightness) compression, in the case where the compression is performed at the identical lightness as shown in FIG. 19, there is an advantage that the brightness itself is maintained. However, there is a problem that a chroma of a highlight area or a shadow area disappears extremely. Further, in the case where the lightness compression is performed in such the manner as shown in FIG. 20, the reproducibility of the chroma improves in comparison with the compression method shown in FIG. 19. However, there is a problem that unbalance of the lightness occurs due to the hue, whereby feeling of wrongness appears in reproduction image quality.

SUMMARY OF THE INVENTION

The present invention has been made in consideration of the above programs, and an object thereof is to realize satisfactory color matching.

An object of the first invention is to perform color matching processing and color component separation according to kinds of input images, thereby realizing the color matching in consideration of how to use recording agents.

An object of the second invention is to realize satisfactory color matching according to a human's sight characteristic.

In order to achieve the above objects, the present invention has the following structures.

The first invention is characterized by comprising:

a color matching processing means for performing color matching processing according to color reproduction characteristics of input and output apparatuses;

a color separation means for separating image data subjected to the color matching processing, into color components corresponding to recording agents used by the output apparatus; and a control means for controlling a method of the color matching processing and a method of the image data separation, according to a kind of input image.

The second invention is characterized by an image processing method which obtains a color matching processing condition to realize color matching between a first apparatus and a second apparatus, wherein the color matching processing condition that a color reproduction range of the first apparatus is mapped to a color reproduction range of the second apparatus is obtained based on an equal-interval hue line of the Atlas of the Munsell Color System.

Other objects and features of the present invention will become apparent from the following detailed description and the attached drawings.

DETAILED DESCRIPTION OF THE PREFERRED EMBODIMENTS

Figure 2:
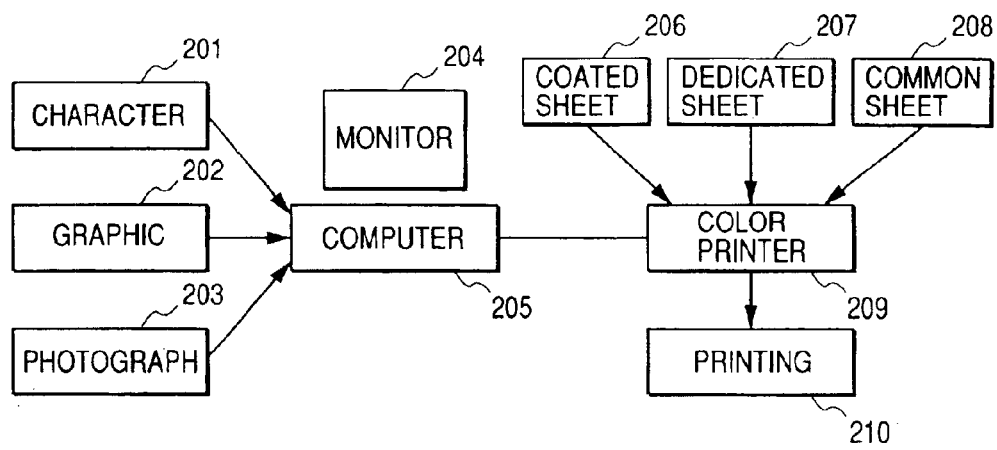
FIG. 2 is a block diagram for explaining a system environment.

FIG. 2 is a block diagram for explaining one example of a system environment to which the embodiment of the present invention is applied. In FIG. 2, numeral 205 denotes a computer which is used by a user to form a document. Numeral 204 denotes a monitor which displays the formed document. Numerals 201, 202 and 203 denote kinds of formed documents. Namely, numeral 201 denotes a character document, numeral 202 denotes a graphic document, and numeral 203 denotes a photograph document. Numeral 209 denotes a color printer which prints the formed document. Numerals 206, 207 and 208 denote kinds of sheets which are used in the color printer 209. Namely, numeral 206 denotes a coated sheet, numeral 207 denotes a dedicated sheet, and numeral 208 denotes a common sheet (or an ordinary sheet). As for these three kinds of sheets, color reproduction ranges at the printing time and their costs differ chiefly. Namely, the color reproduction ranges become small in the order of the coated sheet 206, the dedicated sheet 207 and the common sheet 208, and the costs become lower in the same order. Numeral 210 denotes a printing which was printed by the color printer 209. The user properly uses the sheets (the coated sheet, the dedicated sheet and the common sheet) in accordance with usage of the document composed of characters, graphics and photographs. Even in this case, the user always expects that the printing which has been satisfactorily color-matched with the printer is output.

(First Embodiment)

Figure 1:
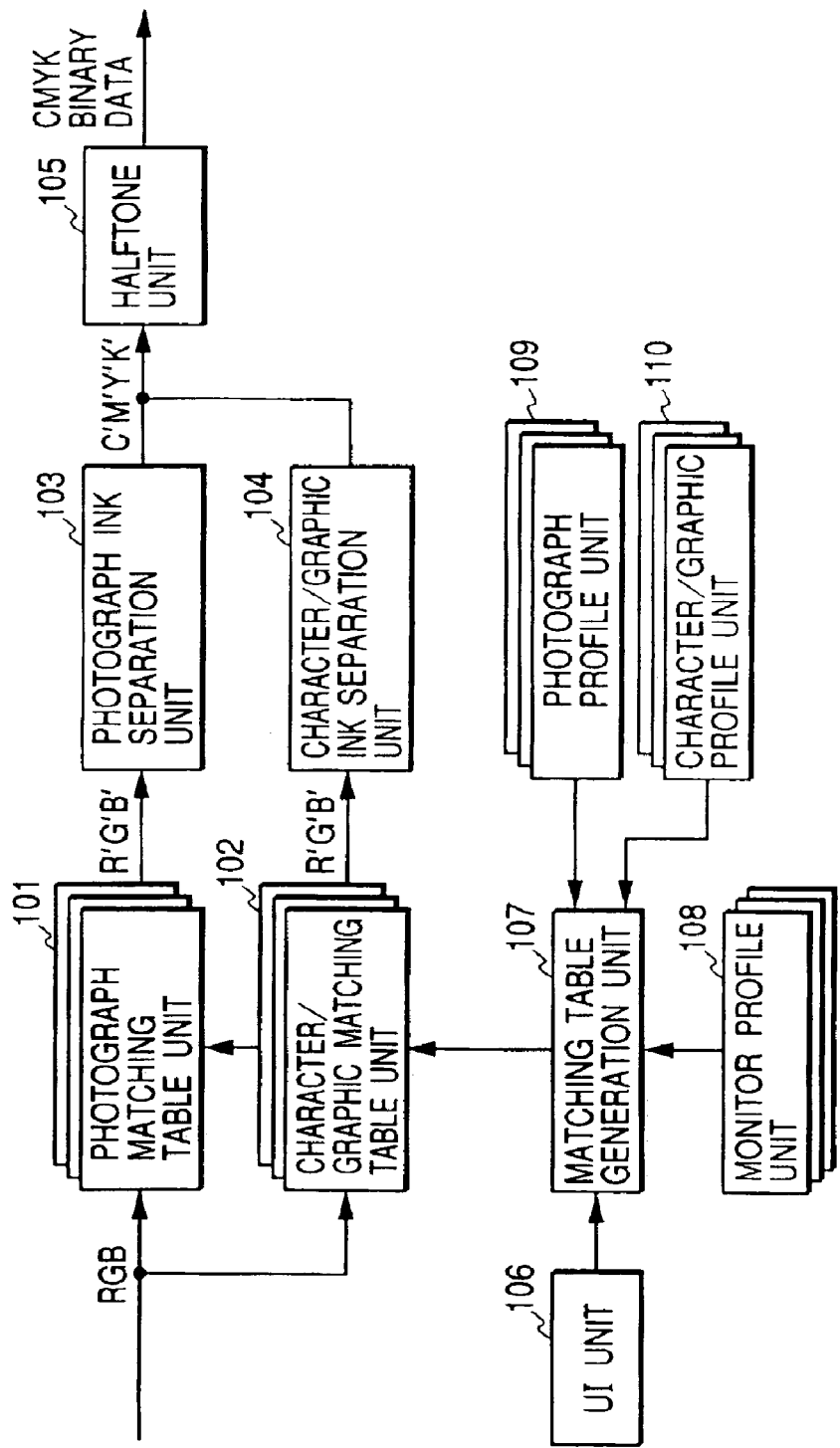
FIG. 1 is a block diagram showing a structure of the first embodiment of the present invention.

FIG. 1 is a block diagram showing a structure of the first embodiment of the present invention. In FIG. 1, numeral 101 denotes a matching table unit for a photograph (called a photograph matching table unit hereinafter), numeral 102 denotes a matching table unit for a character and a graphic (called a character/graphic matching table unit hereinafter), numeral 103 denotes an ink separation (or decomposition) unit for a photograph (called a photograph ink separation unit hereinafter), numeral 104 denotes an ink separation (or decomposition) unit for a character and a graphic (called a character/graphic ink separation unit hereinafter), and numeral 105 denotes a halftone unit. The halftone unit 105 performs processing to match the number of bits of input data with the number of bits manageable by the printer in a halftone method such as a dither method, an error diffusion method or the like. Numeral 106 denotes a UI (user interface) unit by which a user selects a monitor profile, a kind of image and a sheet. Numeral 107 denotes a matching table generation unit, numeral 108 denotes a monitor profile unit, and numeral 109 denotes a profile unit for a photograph (called a photograph profile unit hereinafter). The photograph profile unit 109 stores profile data for the photograph according to each sheet. Numeral 110 denotes a profile unit for a character and a graphic (called a character/graphic profile unit hereinafter) which stores profile data for the character and the graphic.

Figure 3:
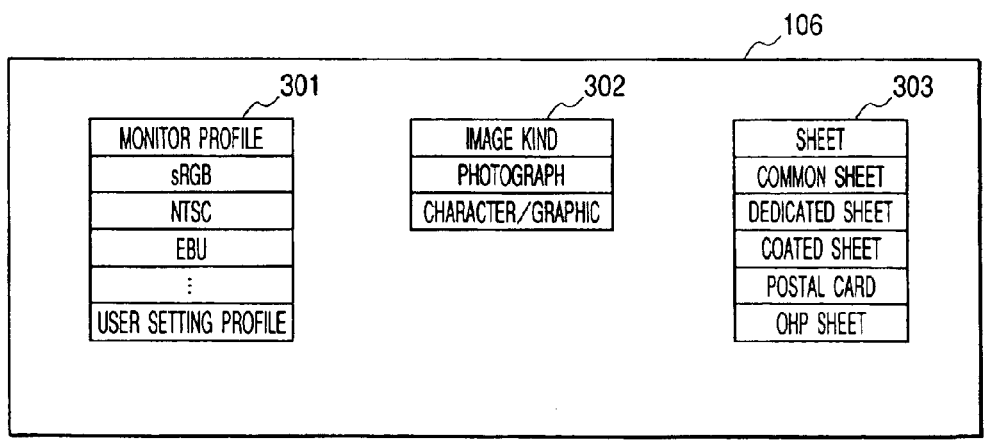
FIG. 3 is a diagram for explaining a user interface of an UI (user interface) unit 106.

The user selects the monitor profile, the kind of image kind and the sheet respectively from a monitor profile menu 301, an image kind menu 302 and a sheet menu 303 as shown in FIG. 3, by using the UI unit 106.

For example, processing to be performed when a sRGB is selected in the monitor profile menu 301, a photograph is selected in the image kind menu 302, and a coated sheet is selected in the sheet menu 303 will be explained. Such selected information is transferred to the matching table generation unit 107. In response to the transferred information, the matching table generation unit 107 loads sRGB profile data and coated sheet profile data respectively from the monitor profile unit 108 and the photograph profile unit 109. Then a photograph matching table is generated in later-described color gamut mapping, and such table data is written in the photograph matching table unit 101.

When character/graphic is selected in the image kind menu 302 of the UI unit 106, the profile data according to the selected sheet is loaded from the character/graphic profile unit 110 to the matching table generation unit 107. Then a character/graphic matching table is generated in the later-described color gamut mapping, and such table data is written in the character/graphic matching table unit 102.

The profile data in the photograph profile unit 109 is the data which is obtained by binarizing R' (red), G' (green) and B' (blue) data through the photograph ink separation unit 103 and the halftone unit 105, and represents a color reproduction characteristic of the result printed by a printer engine. In the photograph profile unit 109, the profile data is stored for each sheet. Similarly, the profile data in the character/graphic profile unit 110 is the data which is obtained by binarizing R', G' and B' data through the character/graphic ink separation unit 104 and the halftone unit 105, and represents a color reproduction characteristic of the result printed by a printer engine. In the character/graphic profile unit 110, the profile data is stored for each sheet.

For example, the profile data representing the color reproduction characteristic includes R (red), G (green), B (blue), C (cyan), M (magenta) and Y (yellow) color reproduction range data representing color reproduction ranges of a device used in the later-described fourth embodiment.

Next, the photograph ink separation unit 103 and the character/graphic ink separation unit 104 will be explained with reference to FIG. 5. It should be noted that the structure of the photograph ink separation unit 103 is the same as the character/graphic ink separation unit 104.

Figure 5:
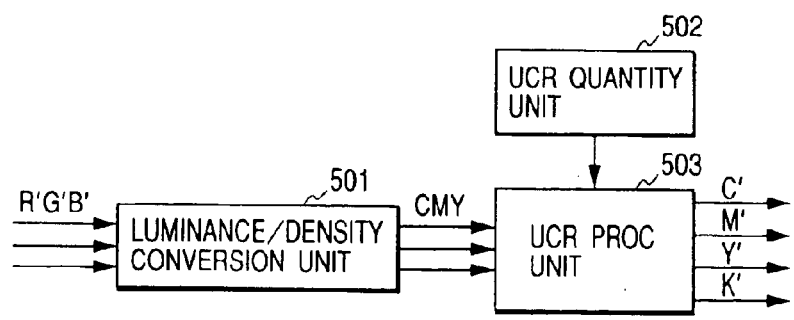
FIG. 5 is a block diagram for explaining structures of an photograph ink separation unit and a character/graphic ink separation unit.

In FIG. 5, numeral 501 denotes a luminance/density conversion unit, and numeral 502 denotes an UCR (under color removal) quantity unit which stores a value to control a set UCR quantity. Numeral 503 denotes an UCR processing unit which performs UCR processing according to the value stored in the UCR quantity unit 502. The luminance/density conversion unit 501 converts the R', G' and B' data into C, M and Y data on the basis of following logarithmic equations.

$$C = -\alpha \log(R'/255) \tag{1}$$

$$M = -\alpha \log(G'/255) \tag{2}$$

$$Y = -\alpha \log(B'/255) \tag{3}$$

where $\alpha$ is an arbitrary real number.

The C, M and Y data are then converted according to a value $\mu\%$ set to the UCR quantity unit 502, as follows.

$$C' = C - (\mu/100) \times \text{Min}(C, M, Y) \tag{4}$$

$$M' = M - (\mu/100) \times \text{Min}(C, M, Y) \tag{5}$$

$$Y' = Y - (\mu/100) \times \text{Min}(C, M, Y) \tag{6}$$

$$K' = \beta(C, M, Y, \mu) \times (\mu/100) \times \text{Min}(C, M, Y) \tag{7}$$

where $\beta(C, M, Y, \mu)$ is a real number which is changed according to the values of C, M, Y and p, and by which how to apply a K ink can be set.

Here, for example, the value p % is set to be 50% in the photograph ink separation unit 103, and the value p % is set to be 100% in the character/graphic ink separation unit 104. Thus, it is possible to make the UCR quantity for the photograph differ from the UCR quantity for the character and the graphic. In the UCR quantity 100% used for the character and the graphic, a process gray based on C, M and Y three colors is not composed, and a gray line is composed by only the K ink. Thus, it is possible to realize the color reproduction which is not influenced easily by a balance change of C, M and Y inks due to a change of a color printer. On the other hand, the UCR quantity for the photograph is set to be 50%, and $\beta(C, M, Y, \mu) = 0$ is set when the C, M and Y values are small, whereby it is possible to realize ink separation that the K ink is not used to reproduce flesh color.

Next, a flow of the image data processing using the multidimensional table generated by the matching table generation unit 107 will be explained.

When the photograph is selected in the image kind menu 302 of the UI unit 106, generated R, G and B photograph image data are converted into the R', G' and B' data by the photograph matching table unit 101 according to multidimensional interpolation calculation processing based on the stored multidimensional table. Then the R', G' and B' data are subjected to ink separation processing suitable for the selected photograph, by the photograph ink separation unit 103. After then, the processed data are binarized by the halftone unit 105, transferred to the printer engine, and subjected to printing.

Similarly, when the character/graphic is selected in the image kind menu 302 of the UI unit 106, generated R, G and B character/graphic image data are subjected to the multidimensional interpolation calculation processing based on the stored multidimensional table by the character/graphic matching table unit 102. After the multidimensional interpolation calculation processing, the obtained R', G' and B' data are subjected to ink separation processing suitable for the character and the graphic by the character/graphic ink separation unit 104. After then, the processed data are binarized by the halftone unit 105, transferred to the printer engine, and subjected to printing.

In the conventional art, when the color matching is performed, the suitable inks are not properly used according to the kind of image, whereby proper use of the suitable ink can not be realized according to the photograph image and the character/graphic image.

According to the present embodiment, as explained above, the color matching units (the photograph matching table unit 101 and the character/graphic matching table unit 102) for matching tint are disposed independently of the ink separation units (the photograph ink separation unit 103 and the character/graphic ink separation unit 104), and the color matching unit and the ink separation unit are selected according to the kind of image, whereby proper use of the suitable ink can be realized according to the kind of image.

It should be noted that the structure used in the first embodiment can of course correspond with the monitor profile set by the user. Further, the color matching units (the matching table units 101 and 102) are provided independently of the ink separation units (the ink separation unit 103 and 104), and the necessary matching tables are previously generated for a combination of the monitor and the sheet supposed to be frequently used. Thus, by previously storing the table for the photograph in the photograph matching table unit 101 and previously storing the table for the character and the graphic in the character/graphic matching table unit 102, it is possible to save the time necessary to generate the matching table, thereby performing the printout processing at high speed.

(Second Embodiment)

In the first embodiment, the means for realizing the color matching is provided independently of the means for realizing the ink separation, whereby the printout processing can be performed at high speed. The second embodiment proposes to simplify a hardware structure for reduction in costs and color reproduction equivalent to the first embodiment.

Figure 4:
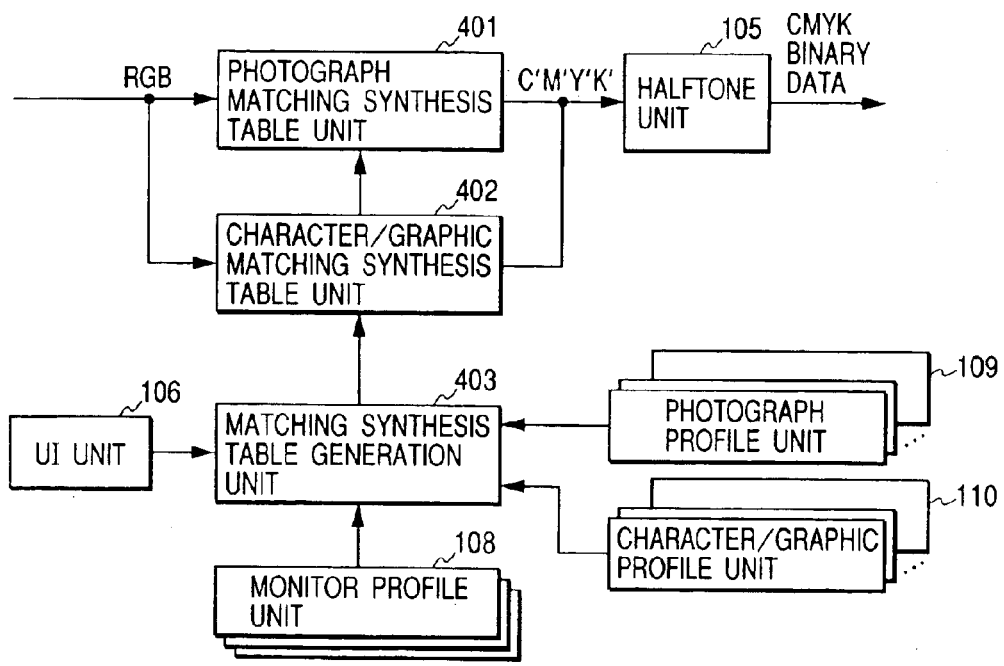
FIG. 4 is a block diagram showing a structure of the second embodiment of the present invention.

FIG. 4 is a block diagram showing a structure of the second embodiment. In FIG. 4, numeral 401 denotes a matching synthesis table unit for a photograph (called a photograph matching synthesis table unit hereinafter), numeral 402 denotes a matching synthesis table unit for a character and a graphic (called a character/graphic matching synthesis table unit hereinafter), and numeral 403 denotes a matching synthesis table generation unit. It should be noted that, like FIG. 1, numerals 105, 106, 108, 109 and 110 denote a halftone unit, a UI unit, a monitor profile unit, a photograph profile unit and a character/graphic profile unit, respectively.

Like the matching table generation unit 107 in the first embodiment, the matching synthesis table generation unit 403 loads monitor profile data from the monitor profile unit 108 according to a monitor profile, an image kind and a sheet all set in the UI unit 106. When the image kind is the photograph and the sheet is a coated sheet, the matching synthesis table generation unit 403 loads photograph coated sheet profile data from the photograph profile unit 109, generates a photograph matching table in later-described color gamut mapping, and performs processing corresponding to that of the photograph ink separation unit 103 of FIG. 1 on the result data of this photograph matching table, thereby generating C, M, Y and K data. Thus, it is possible to generate a synthesis table which converts R, G and B data equivalent to those processed in the two block systems (i.e., the photograph matching table unit 101 and the photograph ink separation unit 103) shown in FIG. 1 into the C, M, Y and K data. Then this synthesis table is stored in the photograph matching synthesis table unit 401.

Similarly, when the character/graphic is selected in the image kind menu 302 of the UI unit 106, the data are loaded from the monitor profile unit 106 and the character/graphic profile unit 110, and the loaded data is subjected to color gamut mapping and image synthesis processing. A character/graphic matching synthesis table which is obtained as a result of such the processing is stored in the character/graphic matching synthesis table unit 402.

Next, a flow of image data processing in the second embodiment will be explained. When the photograph is selected in the image kind menu 302 of the UI unit 106, the generated R, G and B photograph image data are subjected to the multidimensional interpolation calculation processing by the photograph matching synthesis table unit 401 on the basis of the stored synthesis table. Then C', M', Y' and K' data subjected to the multidimensional interpolation calculation processing are binarized by the halftone unit 105, transferred to a printer engine, and subjected to printing. When the image data is the character or the graphic, the same processing as above is performed by using the character/graphic matching synthesis table unit 402.

As explained above, there is no need to provide plural tables in each of the photograph matching table unit 101 and the character/graphic matching table unit 102 as in the first embodiment. Also, there is no need to provide any hardware corresponding to the photograph ink separation unit 103 and the character/graphic ink separation unit 104 as in the first embodiment, whereby it is possible to simplify the hardware structure of the color matching apparatus and thus reduce the costs.

(Third Embodiment)

In the first embodiment, the hardware structures as shown in FIG. 5 are-used for the photograph ink separation unit 103 and the character/graphic ink separation unit 104. However, it is possible to use a three-input and four-output table for converting R, G and B data into C, M, Y and K data and a hardware structure for executing multidimensional interpolation calculation.

Figure 6:
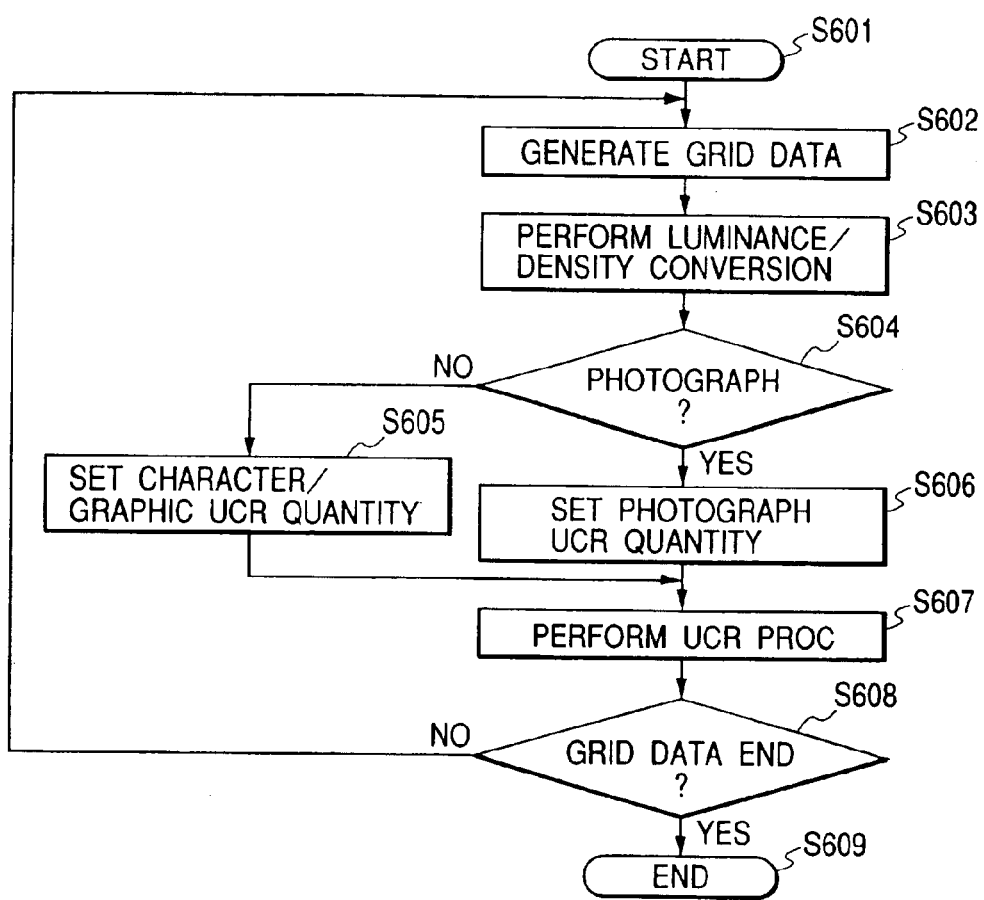
FIG. 6 is a flow chart for explaining processing to generate an ink separation table for converting R, G and B data into C, M, Y and K data in the third embodiment of the present invention.

FIG. 6 is a flow chart for explaining processing to generate a three-input and four-output ink separation table which converts the R, G and B data into the C, M, Y and K data. In FIG. 6, symbol S601 denotes a start step, symbol S602 denotes a grid data generation step of generating R, G and B grid data, symbol S603 denotes a luminance/density conversion step, symbol S604 denotes a judgment step of judging whether or not the table to be generated is for the photograph, symbol S605 denotes a UCR quantity setting step for a character and a graphic, symbol S606 denotes a UCR quantity setting step for a photograph, symbol S607 denotes a UCR processing step, symbol S608 denotes a grid data end judgment step, and symbol S609 denotes an end step.

First, in the step S602, values of the R, G and B data input to the table constituting the ink separation unit are generated. For example, when grid data is made of 17×17×17 slice, following data are sequentially generated at intervals of 16 for each of R, G and B.

| R | G | B |
|---|---|---|
| 0 | 0 | 0 |
| 0 | 0 | 16 |
| 0 | 0 | 32 |
| . | . | . |
| . | . | . |

-continued

| R | G | B |
|---|---|---|
| . | . | . |
| 0 | 0 | 255 |
| 0 | 16 | 0 |
| 0 | 16 | 16 |
| . | . | . |
| . | . | . |
| 255 | 255 | 255 |

Then, in the step S603, the generated R, G and B data are subjected to luminance/density conversion on the basis of the logarithmic equations (1), (2) and (3). In these equations, it should be noted that a is an arbitrary real number.

Next, it is judged in the step S604 whether or not the generated table is the photograph ink separation table. If judged that the generated table is the photograph ink separation table, then in the UCR quantity setting step S606 a UCR quantity ($\mu\%$) for the photograph is set. Conversely, if judged that the generated table is not the photograph ink separation table, then in the character/graphic UCR quantity setting step S605 a UCR quantity ($\mu\%$) for the character or the graphic is set.

In the UCR processing step S607, the UCR processing is performed by using the UCR quantity ($\mu\%$) set in the step S605 or S606, in accordance with the equations (4), (5), (6) and (7), thereby obtaining the C, M, Y and K data.

In the grid data end judgment step S608, it is judged whether or not generation of all the necessary grid data ends. If judged that the generation of the necessary grid data does not end, the flow returns to the grid data generation step S602 to generate next grid data. Conversely, if judged that the generation of the necessary grid data ends, the flow advances to the end step S609 to terminate the generation of the three-input and four-output ink separation table which converts the R, G and B data into the C, M, Y and K data.

The generated photograph table data is written in the table of the photograph ink separation unit 103, and the character/graphic table data is written in the table of the character/graphic ink separation unit 104.

According to the present embodiment, the photograph ink separation unit 103 and the character/graphic ink separation unit 104 in the first embodiment can be realized by the three-input and four-output ink separation table and the multidimensional interpolation calculation. Thus, the complicated hardware structure such as a logarithmic converter necessary in the first embodiment is not required, thereby simplifying a hardware structure and realizing cost reduction.

In the above first to third embodiments, the hardware circuits are used. The hardware circuit is incorporated in the color printer 209 or the computer 205 shown in FIG. 2. Concretely, this hardware circuit is incorporated in a controller of the color printer 209 or as a printer board in the computer 205.

The present invention is not limited to the hardware circuit and can be achieved also with software. In this case, a program which has been stored in a hard disk in the computer and realizes the operation of each embodiment (FIGS. 1, 4 and 6) operates through an OS (operating system) and a printer driver, under the control of a CPU.

(Fourth Embodiment)

In the fourth embodiment, the color gamut mapping used in each of the first to third embodiments will be explained.

For example, a concrete method of the color gamut mapping which is performed by the matching table generation unit 107 with use of the UI unit 106, the monitor profile unit 108, the photograph profile unit 109, and the character/graphic profile unit 110 in the first embodiment will be explained in detail.

Figure 7:
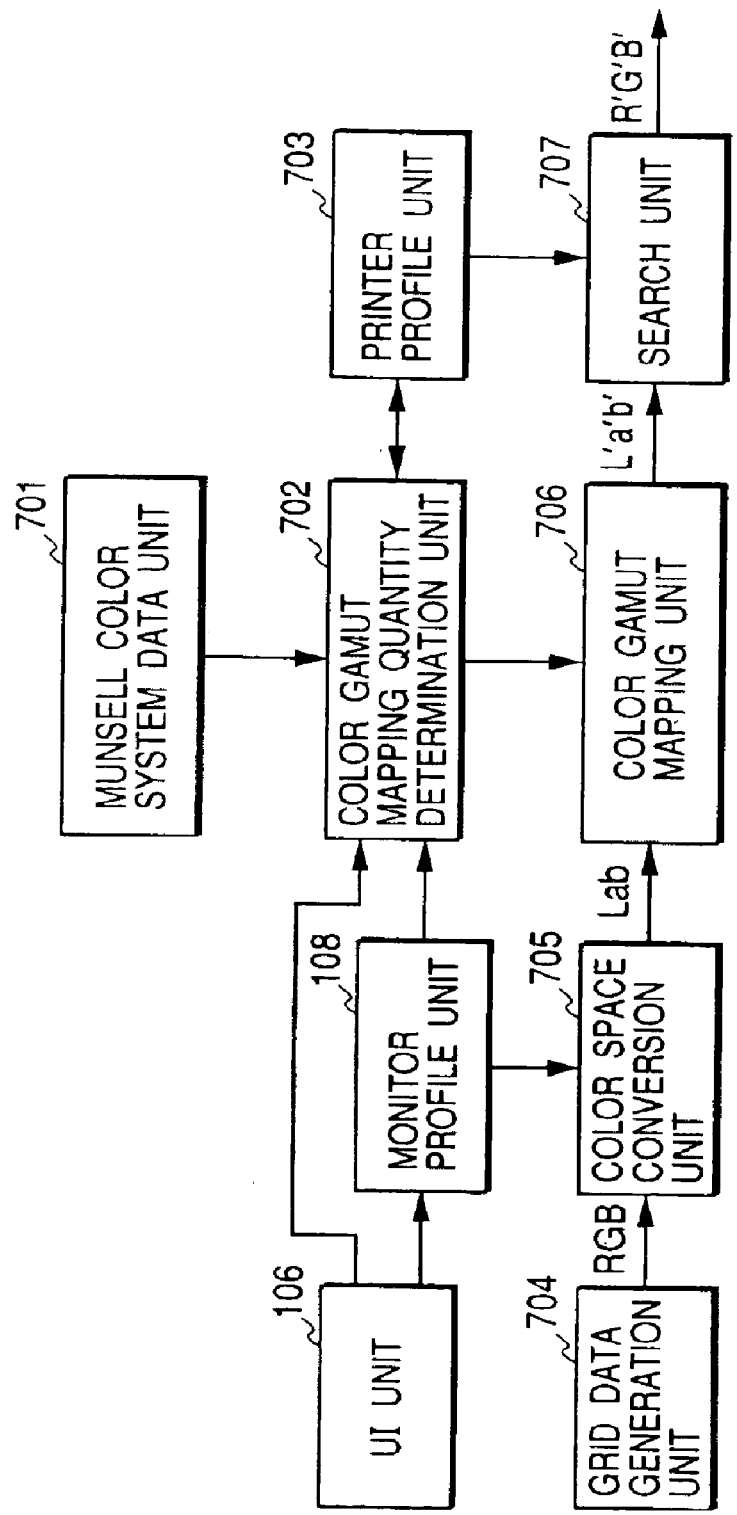
FIG. 7 is a block diagram showing a structure of the fourth embodiment of the present invention.

FIG. 7 is a block diagram showing a structure of the fourth embodiment. In FIG. 7, numeral 106 denotes the UI unit, and numeral 108 denotes the monitor profile unit. Numeral 701 denotes a Munsell Color System data unit in which L*a*b* data based on the Atlas of the Munsell Color System has been stored. Numeral 702 denotes a color gamut mapping quantity determination unit. Numeral 703 denotes a printer profile unit in which the data of the photograph profile unit 109 and the character/graphic profile unit 110 shown in FIG. 1 are stored. Numeral 704 denotes a grid data generation unit, numeral 705 denotes a color space conversion unit which converts the R, G and B data into the L*a*b* data based on the monitor profile unit 108, and numeral 706 denotes a color gamut mapping unit which performs the color gamut mapping based on the result of the color gamut mapping quantity determination unit 702. Numeral 707 denotes a search unit which searches the R, G and B data before ink separation, to reproduce colors based on the L*a*b* data.

Hereinafter, the processing in the fourth embodiment will be explained with reference to a flow chart shown in FIG. 8.

Symbol S801 denotes a start step. Symbol S802 denotes a step of setting a monitor profile, an image kind and a sheet based on an instruction from the UI unit 106. Namely, the user selects appropriate items in the menus 301 to 303 of the UI unit 106 shown in FIG. 3 and performs the setting based on the selected items.

Symbol S803 denotes a step of setting the printer profile based on the set values of the image kind and the sheet. Namely, the printer profile data corresponding to the image kind and the sheet is selected from the printer profile unit 703.

Symbol S804 denotes a step of determining the color gamut mapping quantity based on the monitor profile and the printer profile. Namely, the color gamut mapping quantity is determined based on the monitor and printer profile data set from the monitor profile unit 108 and the printer profile unit 703 and the data based on the Munsell Color System obtained from the Munsell Color System data unit 701.

Figure 9:
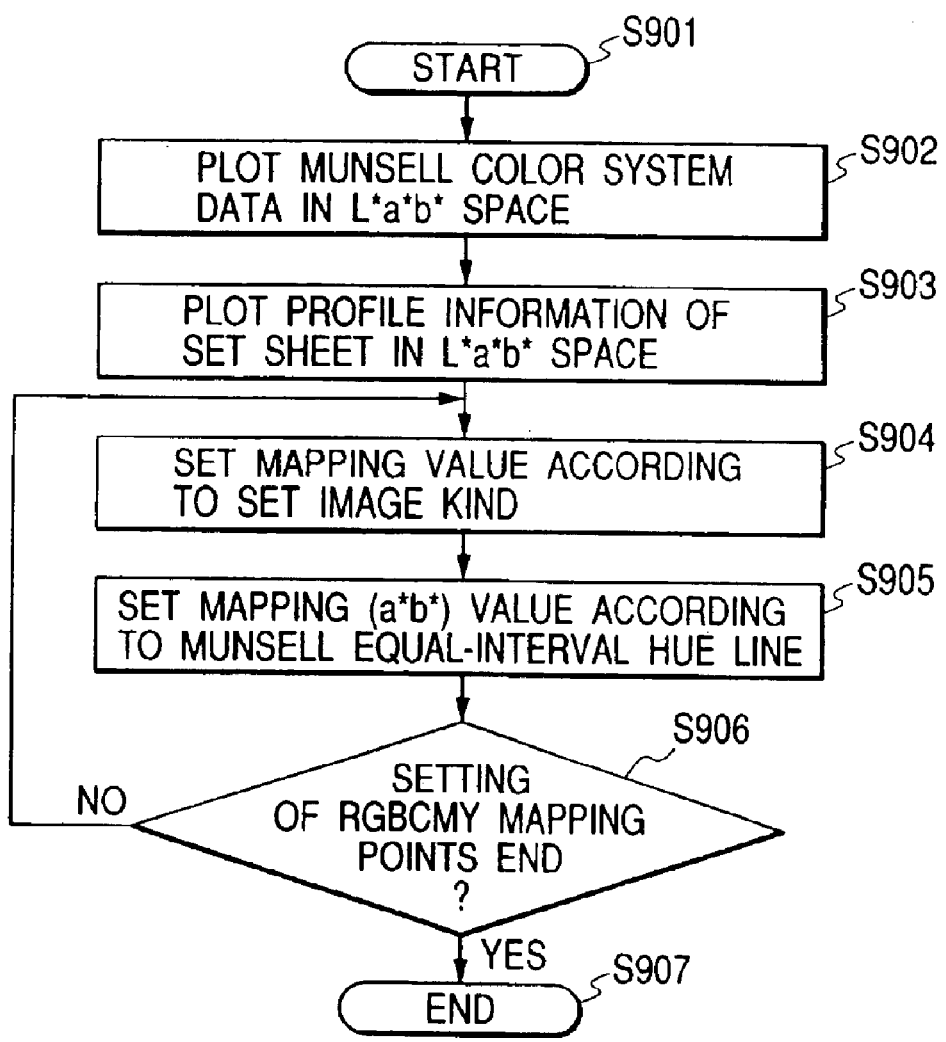
FIG. 9 is a flow chart for explaining a color gamut mapping quantity determination step S804 based on monitor and printer profiles shown in FIG. 8.

FIG. 9 is a flow chart for explaining in detail the color gamut mapping quantity determination step S804 based on the monitor and printer profiles.

In the present embodiment, the color gamut mapping quantity is three-dimensionally determined based on six representative points of R (red), G (green), B (blue), C (cyan), M (magenta) and Y (yellow). Hereinafter, a method to determine mapping points after the color gamut mapping for these six points will be explained.

In FIG. 9, symbol S901 denotes a start step of starting to determine the color gamut mapping quantity.

Symbol S902 denotes a step of plotting the data based on the Munsell Color System, in the L*a*b* color space. Actually, the Munsell Color System which is three-dimensionally composed of a value (Munsell Value), a hue (Munsell Hue) and a chroma (Munsell Chroma) is plotted in the L*a*b* three-dimensional color space. However, in the present embodiment, in order to simplify the explanation, a chart in which values of the hue (Munsell Hue) and chroma (Munsell Chroma) obtained at the certain value (Munsell Value) are plotted on an L*a*b* plane is shown in FIG. 10.

Figure 10:
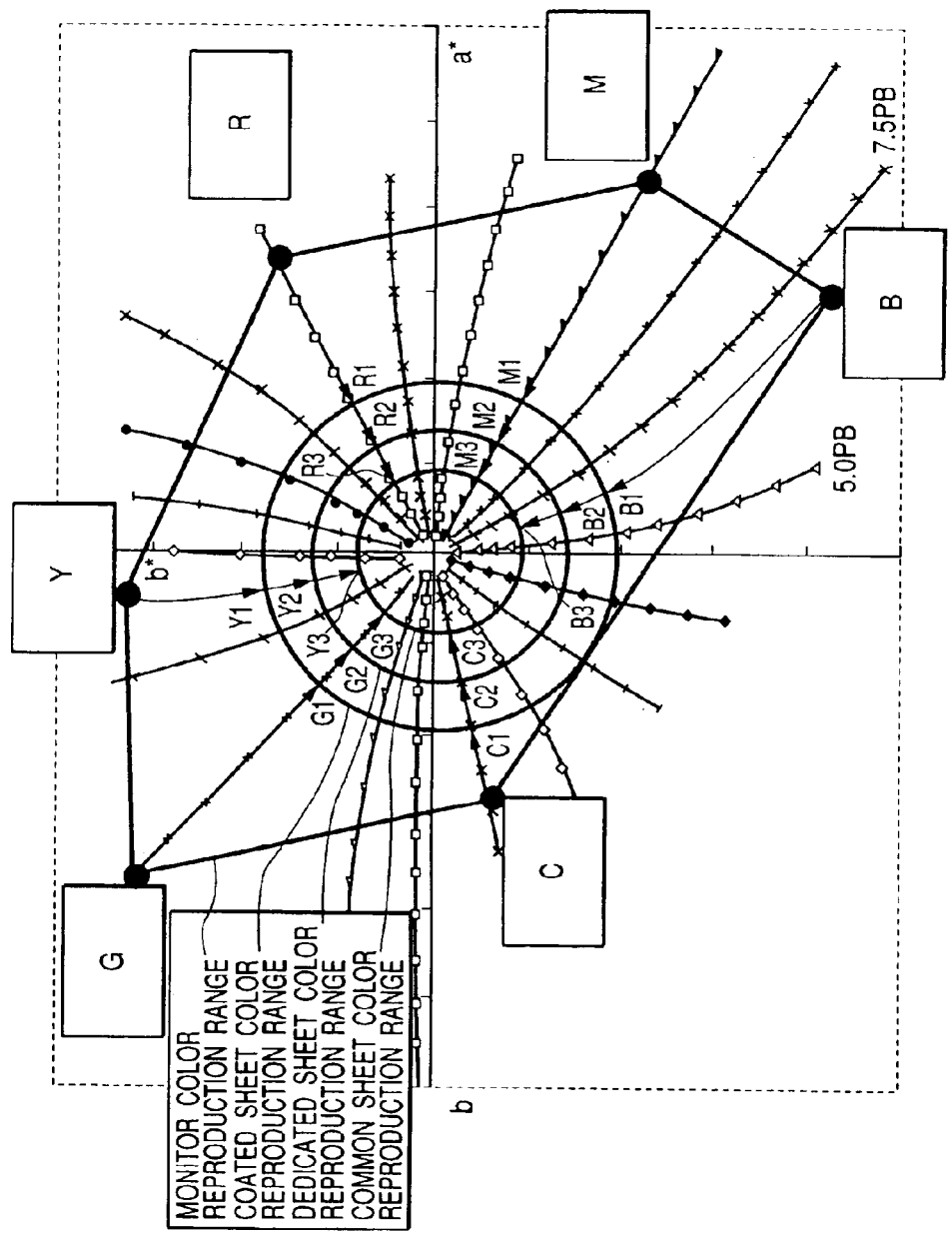
FIG. 10 is a diagram for explaining the flow chart shown in FIG. 9.

Symbol S903 denotes a step of plotting set sheet profile information in the L*a*b* color space, as shown in FIG. 10.

FIG. 10 shows color reproduction ranges (or gamuts) of the coated sheet, the dedicated sheet and the common sheet. As apparent from FIG. 10, when the coated sheet, the dedicated sheet and the common sheet are compared with others, magnitudes of the color reproduction ranges (or gamuts) of these sheets satisfy the relation "coated sheet>dedicated sheet>common sheet".

In steps S904, S905 and S906, the mapping points after the color gamut mapping for the six representative points of R, G, B, C, M and Y are sequentially determined.

Figure 11:
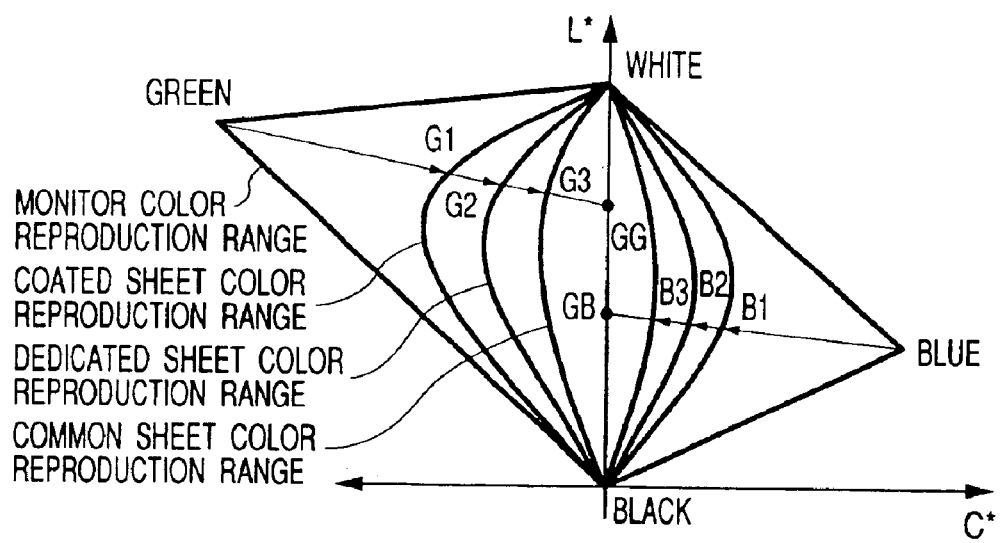
FIG. 11 is a diagram for explaining a step S904.

Symbol S904 denotes the step of setting the mapping value according to the set image kind. FIG. 11 is a diagram for explaining the step S904. FIG. 11 in which the vertical axis represents the value (L*) and the horizontal axis represents the chroma (C*) shows the color reproduction ranges (gamuts) of the monitor, the coated sheet, the dedicated sheet and the common sheet. For example, the setting value of B is defined by a node (or vertex) between a straight line connecting B with a point GB defined on the gray axis (the vertical axis) and a color reproduction range (gamut) of the printer. Therefore, the setting value in case of the coated sheet is defined by a point B1, the setting value in case of the dedicated sheet is defined by a point B2, and the setting value in case of the common sheet is defined by a point B3. Other points GR, GG, GC, GM and GY are set respectively in correspondence with R, G, C, M and Y. Thus, the node (or vertex) between the straight line connecting the color with its corresponding point and the color reproduction range (gamut) of the printer is defined as the value after the mapping.

Symbol S905 denotes the step of setting the mapping (a*b*) value along an equal-interval hue line of the Atlas of the Munsell Color System. The processing in the step S905 will be explained with reference to FIG. 10. In FIG. 10, the equal-interval hue line of the Atlas of the Munsell Color System has been plotted in the step S902 of plotting the data based on the Munsell Color System in the L*a*b* color space. In the step S905, the mapping (a*b*) points of R, G, B, C, M and Y for the monitor are sequentially calculated and plotted based on the color reproduction range data stored in the monitor profile. For example, in case of B, the mapping point is plotted between points 5.0PB and 7.5PB. Thus, the plotted line is subjected to the non-linear color gamut mapping toward an achromatic color direction along these two equal-interval hue lines of the Munsell Color System, and nodes B1, B2 and B3 between the plotted line and the color reproduction ranges of the coated sheet, the dedicated sheet and the common sheet are defined as the mapping points respectively. In FIG. 10, the explanation is performed based on a two-dimensional plane for simplification. However, in actual, non-linear mapping is performed three-dimensionally on two a*b* planes defined by upper and lower Munsell Values based on the value determined in the step S904.

Symbol S906 denotes the step of judging whether or not the determination of the mapping points of the six points R, G, B, C, M and Y ends. If NO in the step S906, the flow returns to the step S904 to define the equal-interval hue line of the Atlas of the Munsell Color System corresponding to other points R, G, C, M and Y and sequentially determine the (a*b*) value of the mapping point. Conversely, if YES in the step S906, the flow advances to a step S907 to end the determination processing of the color gamut mapping quantity.

In steps S805, S806, S807, S808, S809 and S810, the color gamut mapping is performed in the L*a* be color space for each of the grid points of R, G and B, based on the values set in the steps S802, S803 and S804. Then the R, G and B data for realizing the L*a*b* data after the color gamut mapping are searched, and the matching table for the photograph or the character/graphic is generated.

Symbol S805 denotes the step of generating R, G and B grid point data. In this step, the data of the number of grid points (i.e., the number of slices) are sequentially generated.

| R | G | B |
|---|---|---|
| 0 | 0 | 0 |
| 0 | 0 | 16 |
| 0 | 0 | 32 |
| . | . | . |
| . | . | . |
| . | . | . |
| 0 | 0 | 255 |
| 0 | 16 | 0 |
| 0 | 16 | 16 |
| . | . | . |
| . | . | . |
| . | . | . |
| 255 | 255 | 255 |

Symbol S806 denotes the color space conversion processing step based on the set value of the monitor profile. In this step, the color space conversion from the R, G and B data into the L*a*b* data is performed based on the monitor profile data and following equations.

$$\begin{array}{l} X \quad a11 \; a12 \; a13 \quad R \\ Y = a21 \; a22 \; a23 \quad G \\ Z \quad a31 \; a32 \; a33 \quad B \end{array} \quad (8)$$

$$L^* = 116 \, f(Y/Yn) - 16 \quad (9)$$

$$a^* = 500(f(X/Xn) - f(Y/Yn)) \quad (10)$$

$$b^* = 200(f(Y/Yn) - f(Z/Zn)) \quad (11)$$

but $$f(X/Xn) = (X/Xn)^{(1/3)} \quad X/Xn > 0.008856 \quad (12)$$

$$f(X/Xn) = 7.787(X/Xn) + 16/116$$
$$X/Xn \leq 0.008856 \quad (13)$$

where a11 to a33 are coefficients which are obtained from chromaticity points of R, G and B described in the selected monitor profile and a chromaticity point of white, and Xn, Yn and Zn are values of XYZ tristimulus values of monitor white.

Figure 13:
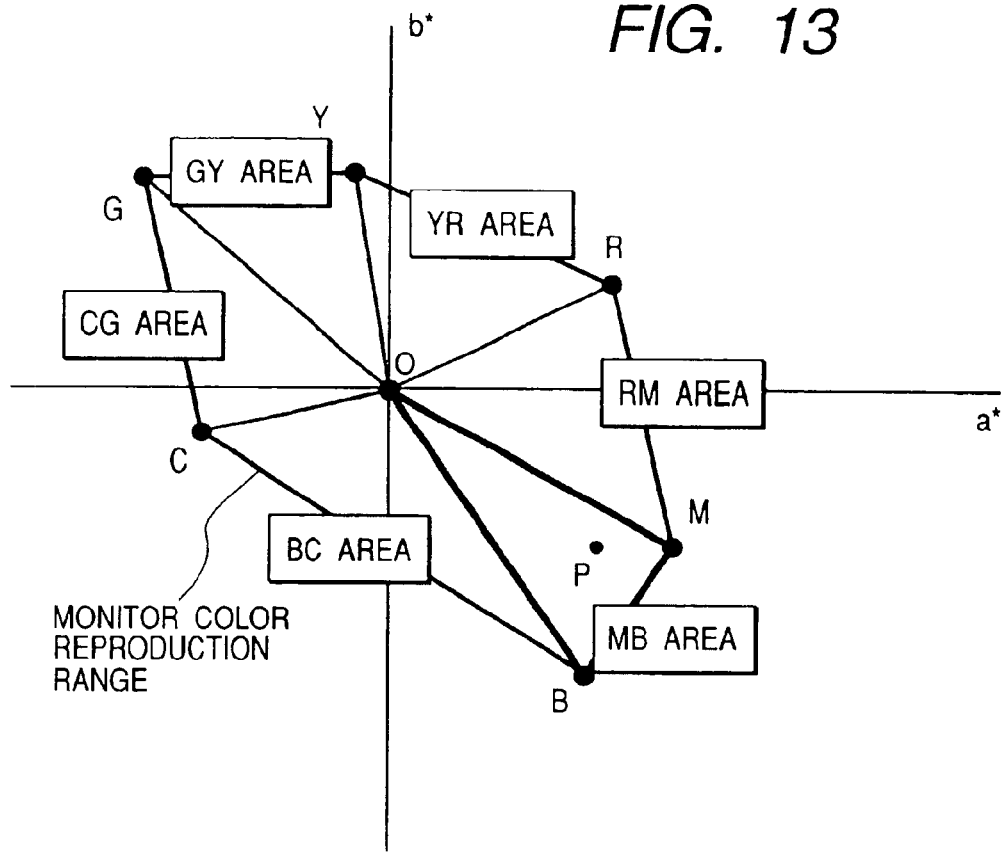
FIG. 13 is a diagram for explaining six color areas in a color area judgment step S807 shown in FIG. 8.

Symbol S807 denotes the step of judging which area the (a*b*) value subjected to the color gamut mapping in the step S806 belongs to. Processing of this step will be explained with reference to FIG. 13. In FIG. 13, symbols MR, MG, MB, MC, MM and MY are obtained by plotting monitor R, G, B, C, M and Y on an a*b* plane. Around a central point O, the above six points divides the area into six areas. Namely, the area between O-MR and O-MM is defined as an RM area, the area between O-MM and O-MB is defined as an MB area, the area between O-MB and O-MC is defined as a BC area, the area between O-MC and O-MG is defined as a CG area, the area between O-MG and O-MY is defined as a GY area, and the area between O-MY and O-MR is defined as a YR area. For example, the step S807 judges that the MP point belongs to the MB area as shown in FIG. 13.

Symbol S808 denotes the step of performing the mapping processing based on the two mapping points as the judgment result of the step S807. As shown in FIG. 13, the mapping processing is performed based on the mapping points of R and M when the (a*b*) value belongs to the RM area. Similarly, the mapping processing is performed based on the mapping points of M and B when the (a*b*) value belongs to the MB area, the mapping processing is performed based on the mapping points of B and C when the (a*b*) value belongs to the BC area, the mapping processing is performed based on the mapping points of C and G when the (a*b*) value belongs to the CG area, the mapping processing is performed based on the mapping points of G and Y when the (a*b*) value belongs to the GY area, and the mapping processing is performed based on the mapping points of Y and R when the (a*b*) value belongs to the YR area.

Figure 15:
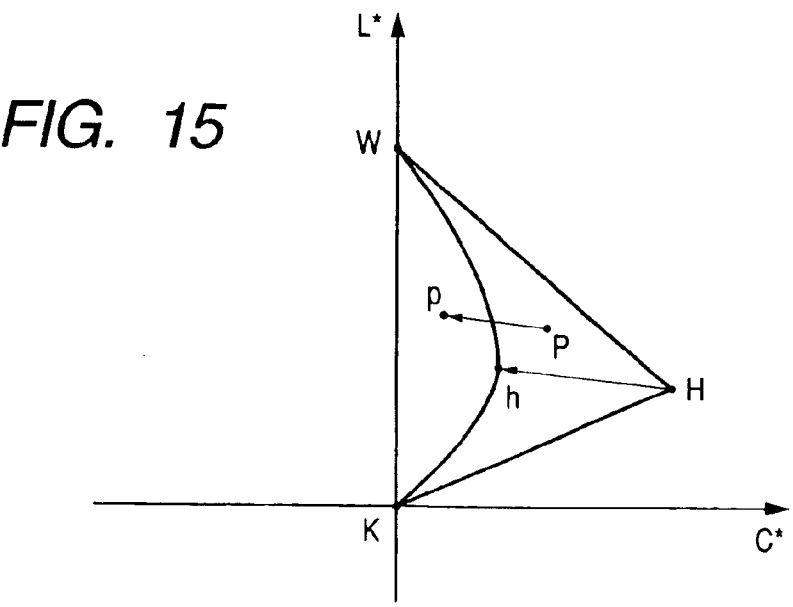
FIG. 15 is a diagram for explaining the mapping processing step S808 based on the two mapping points shown in FIG. 8.
Figure 14:
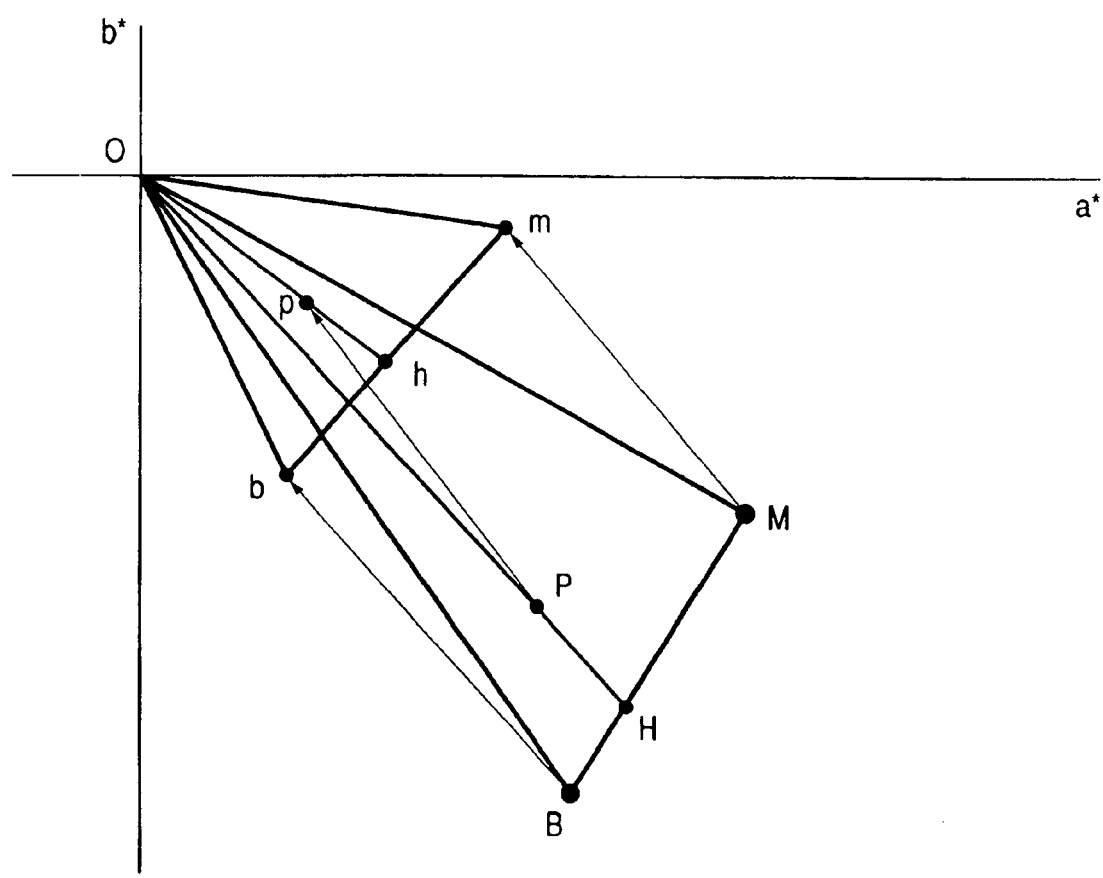
FIG. 14 is a diagram for explaining a mapping processing step S808 based on two mapping points shown in FIG. 8.

Hereinafter, since the MP point belongs to the MB area as shown in FIG. 13, the mapping processing based on the mapping points of M and B will be explained with reference to FIG. 14 (a*b* value) and FIG. 15 (L* value). In FIG. 14, a point O represents an origin on the a*b* plane, a point M represents M on the monitor, a point B represents B on the monitor, and a point P represents a target. A point H represents a node (or vertex) between a straight line extended from a line connecting the points O and P and a straight line MB. A point m represents the mapping point of M, a point b represents the mapping point of B, and a point p represents the mapping point of the point P. A point h represents a node (or vertex) between a straight line extended from a line connecting the points O and p and a straight line mb.

Here, the mapping of the point P is performed to satisfy following equations.

$$\angle MOP : \angle BOP = \angle mOp : \angle bOp. \quad (14)$$

$$\text{distance Op} = \gamma(\text{distance OP/distance OH}) \times (\text{distance Oh}) \quad (15)$$

Thus, the relation of the hue of the point P to the points M and B, and the relation of the hue of the point p to the points m and b are maintained, whereby the hue of the internal area can be defined according to the mapping points of m and b. As to the chroma, by providing a non-linear function to a ratio (distance OP/distance OH) of the maximum gamut of the point P, a compression rate can be changed by the chroma. By changing the compression rate based on the chroma, it is possible to reduce the compression quantity in an achromatic color area which is sensitive for a human's sight characteristic, while it is possible to enlarge the compression quantity in a high-chromatic color area which is insensitive for the human's sight characteristic. Next, a method of calculating the mapping quantity for the value (lightness) will be explained with reference to FIG. 15. In FIG. 15, mapping points L(H), L(h), L(P) and L(p) for points H and h represent the value (L*) for the points H, h, P and p.

Here, the mapping value L(p) for the point p (the mapping point for the point P) is calculated by following equations.

$$L(p) = L(P) + \gamma(\text{distance OP/distance OH}) \times (L(h) - L(H)) \quad (16)$$

$$L(h) = (\text{distance } (MH) \times (L(b) - L(B)) + \text{distance } (HB) \times (L(m))) / \text{distance } (MB) \quad (17)$$

Thus, the value compression for the point P existing in the MB area is proportional to the distance relation between the points M and B. Further, it is possible to non-linearly set the value compression according to the relation of the chroma, by using the M mapping point m and the B mapping point b.

Symbol S809 denotes the search step of fetching the R, G and B data to realize the mapped L*a*b* data. The processing in this search step S809 is performed by the data of the photograph profile unit 109 and the character/graphic profile unit 110 for each sheet. As already explained in the first embodiment, the data of the photograph profile unit 109 is the data which is obtained by binarizing the R', G' and B' data through the photograph ink separation unit 103 and the halftone unit 105, and represents the color reproduction characteristic (L*a*b*) of the result printed by the printer engine. Namely, the data representing the relation between RGB and L*a*b* is stored in the photograph profile unit 109, whereby it is possible to search based on the stored data the combination of R, G and B to realize L*a*b* data fetched in the processing up to the step S808.

Symbol S810 denotes the step of judging whether or not the search for all the R, G and B grid data ends. Namely, it is judged in this step whether or not the mapping points for all the grid data have been fetched. If NO in the step S810, the flow returns to the step S805 to calculate next grid data. Conversely, if YES in the step S810, the flow advances to a step S811 to end the processing.

Figure 18:
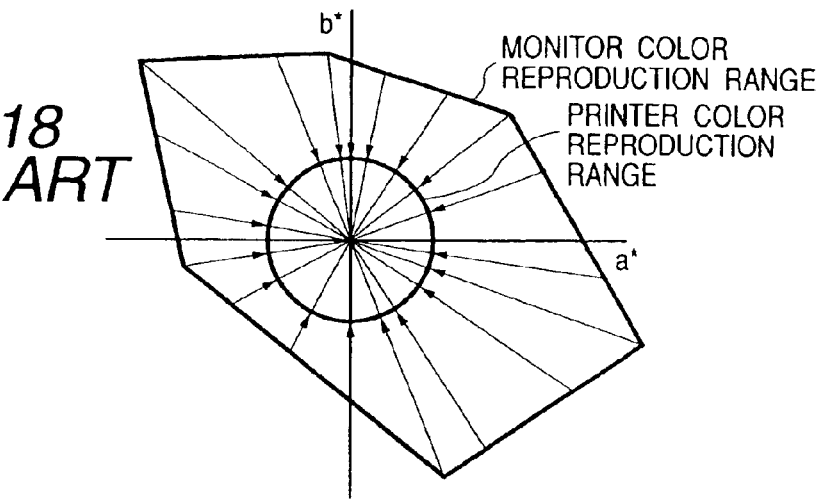
FIG. 18 is a diagram for explaining a conventional example that compression processing is performed without dislocating hue angles in an a*b* plane.
Figure 19:
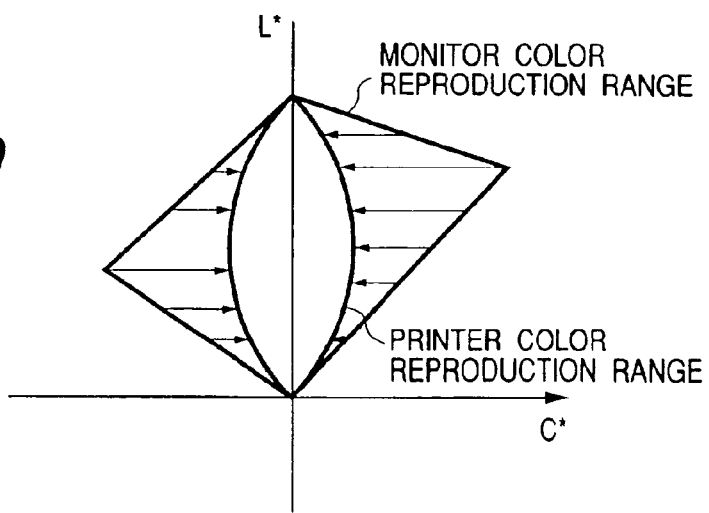
FIG. 19 is a diagram for explaining a conventional example that color gamut mapping is performed at identical lightness.
Figure 20:
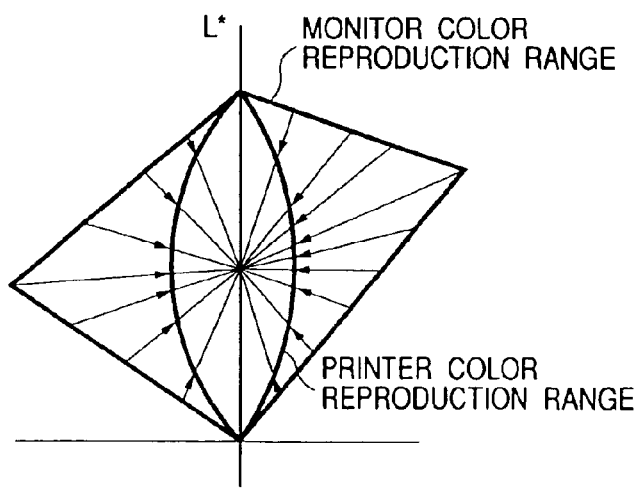
FIG. 20 is a diagram for explaining a conventional example that color gamut mapping is performed toward one specific point on an achromatic color axis.

As apparent from the above explanation of the step S904, since it is possible to control the compression quantity of the value/chroma for each of R, G, B, C, M and Y hues, it is possible to realize the optimum color gamut mapping of the value/chroma for each hue. Further, as shown in FIG. 11, even if the sheet is different, it is possible to conform the color gamut mapping of the value/chroma for each hue with others, thereby absorbing the sizes of the color reproduction ranges according to the different-sized sheets. Thus, even if the sheet is changed, it is possible to realize conformity of tints. Therefore, it is possible to prevent the conventional extreme chroma deterioration in case of the equal-value compression as shown in FIG. 18. Also, it is possible to solve the conventional problem that the unbalance of the value occurs for each hue because the compression for all the colors is performed toward one point on the gray axis.

As apparent from the above explanation of the step S905, the equal-interval hue line is plotted in the L*a*b* color space by using the Atlas of the Munsell Color System which reflects the human's sight characteristic, and the color gamut mapping is performed by using the plotted equal-interval hue line as a guideline, whereby it is possible to eliminate hue displacement which is caused by the fact that the L*a*b* color space does not completely reflect the human's sight characteristic.

(Fifth Embodiment)

Figure 12:
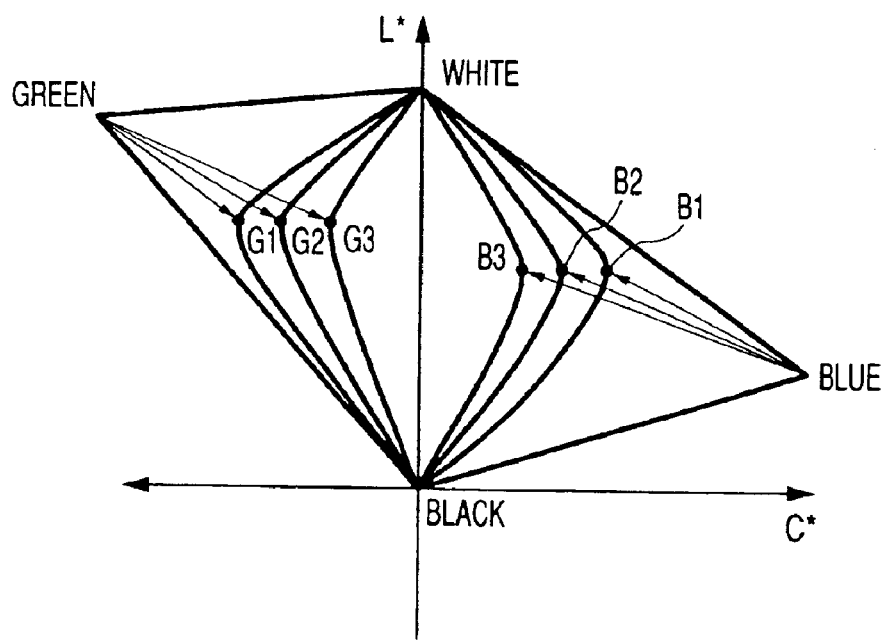
FIG. 12 is a diagram for explaining the step S904 of setting mapping value (lightness) according to a kind of image set in FIG. 9, and explaining lightness setting of a color gamut mapping quantity suitable for character and graphic in the fifth embodiment.

In the fourth embodiment, the values (lightness) are set by using the nodes between the straight lines extending from the points R, G, B, C, M and Y representing the color reproduction range of the monitor toward the points GR, GB, GG, GC, GM and GY defined on the gray axis, as the mapping points of the points R, G, B, C, M and Y to determine the color gamut mapping quantity. However, in the fifth embodiment, as shown in FIG. 12, maximum chroma points on the equal-interval hue line defined on the Atlas of the Munsell Color System are defined to be B1, B2 and B3 for respective sheets as the mapping points for B. Similarly, it is needless to say that maximum chroma points are defined as the mapping points for R, G, C, M and Y other than B.

As above, the compression is performed while seeing the balance of the value/chroma for each hue in the fourth embodiment. However, in the fifth embodiment, it is possible to realize the color gamut mapping which gives priority to the chroma for each hue. Thus, even in the color reproduction of graphics such as a table, a graph and the like, it is possible to realize the color matching suitable for the graphics by which a line, a bar graph can be easily recognized.

As above, in the fifth embodiment, it is possible to realize the color gamut mapping suitable for the graphics. On the other hand, in the fourth embodiment, it is possible to satisfactorily reproduce the continuity of all the colors in the color space, whereby the fourth embodiment is suitable for the photograph.

Thus, when the color gamut mapping is selected from those described in the fourth and fifth embodiments in accordance with the image kind set on the UI unit 106, it is possible to realize the more satisfactory color reproduction.

(Sixth Embodiment)

Figure 8:
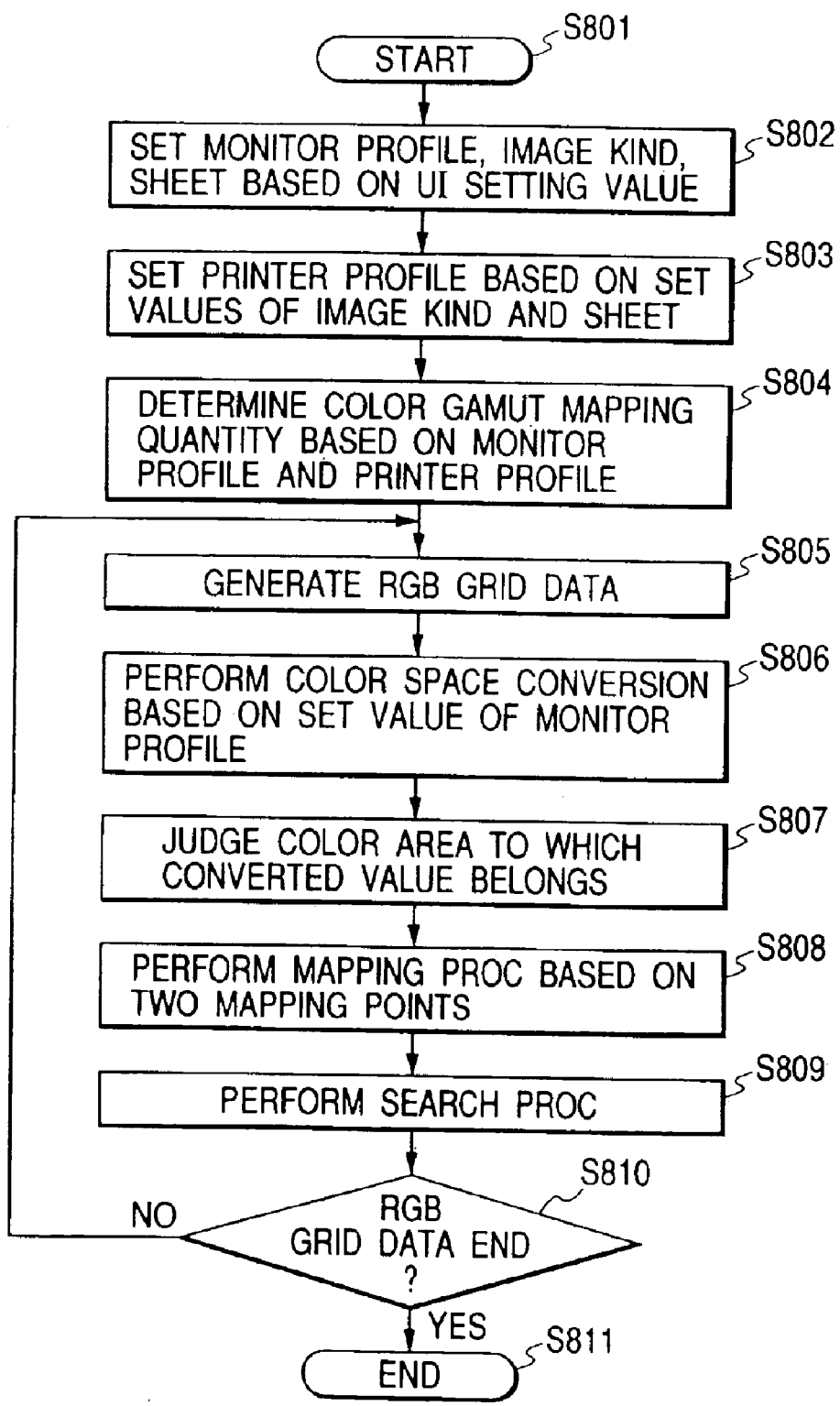
FIG. 8 is a flow chart for explaining processing to generate a color gamut mapping table in the fourth embodiment.
Figure 16:
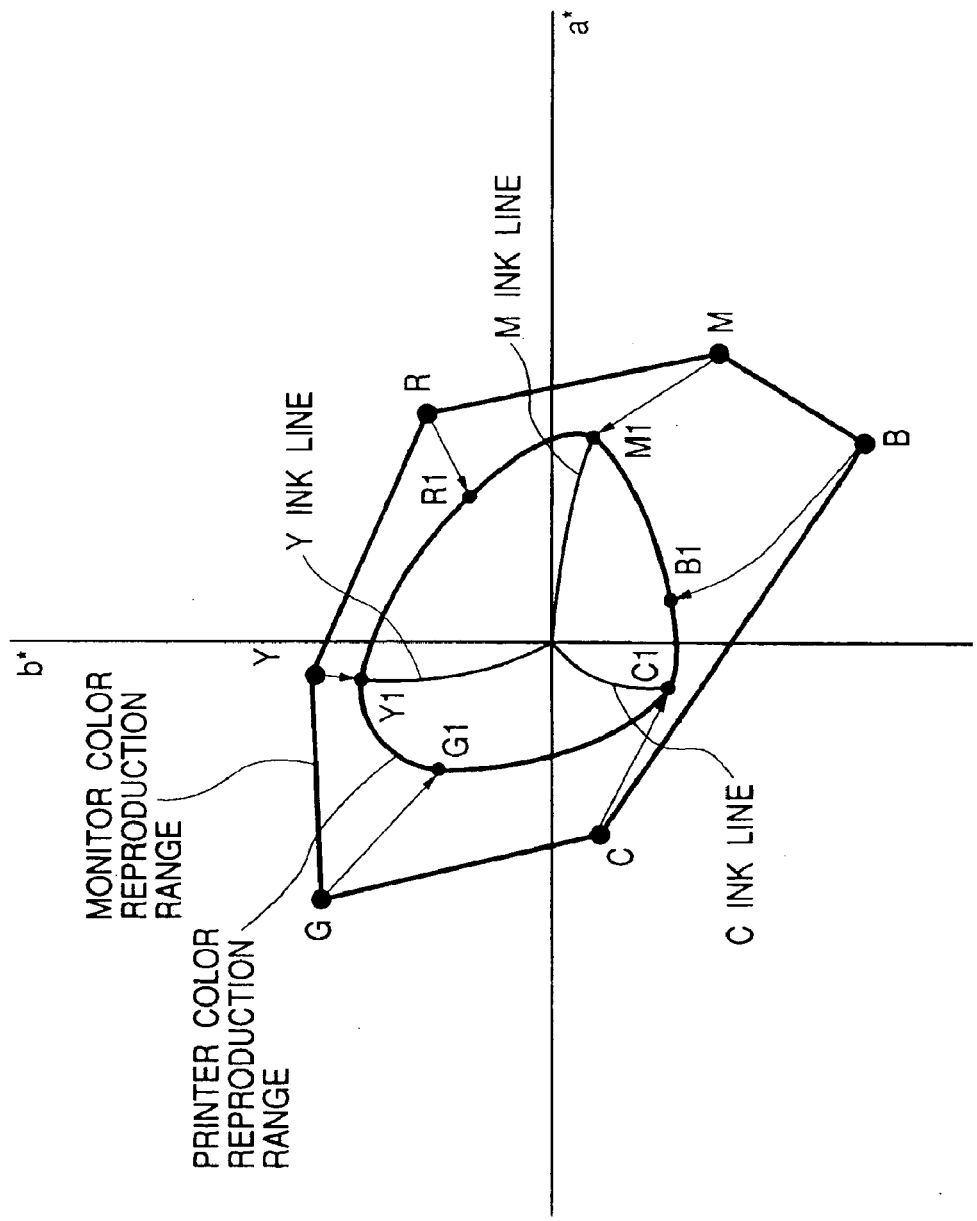
FIG. 16 is a diagram for explaining the color gamut mapping quantity determination step S804 based on the monitor and printer profiles shown in FIG. 8, in the sixth embodiment.

In the fourth embodiment, the mapping points of the points R, G, B, C, M and Y in the color gamut mapping quantity determination step S804 based on the monitor and printer profiles shown in FIG. 8 are determined along the equal-interval hue line defined on the Atlas of the Munsell Color System. In the sixth embodiment, like FIG. 10, the mapping points for R, G and B are determined along the equal-interval hue line defined on the Atlas of the Munsell Color System as shown in FIG. 16. However, it is proposed for C, M and Y a method of determining their mapping points according to ink reproduction colors of the printer.

In FIG. 16, symbols R1, G1, B1, C1, M1 and Y1 denote mapping points respectively for R, G, B, C, M and Y. The mapping points R1, G1 and B1 are determined along the equal-interval hue line defined on the Atlas of the Munsell Color System, like in FIG. 10. However, the mapping points C1, M1 and Y1 respectively for C, M and Y are set on C, M and Y ink lines as shown in FIG. 16. It should be noted that the ink line is the line on a chromaticity diagram which line is reproducible by single color of each ink (i.e., one monochrome ink). Thus, for C, M and Y colors, it is possible to realize the color matching in which each of C, M and Y is reproduced only by each of the C, M and Y inks of the printer.

In the fourth embodiment, when C, M and Y colors are reproduced, there is a problem that graininess grows due to mixture of other inks. However, by applying the method according to the sixth embodiment, it is possible to reduce the graininess in the printer ink color.

Generation of the table for realizing the color gamut mapping and the color space processing explained in the above fourth to sixth embodiments is a part of the functions in the first to third embodiments. Thus, such the generation can be realized by a computer or a printer to which the first to third embodiments are applicable.

For example, when the fourth to sixth embodiments function as software in the computer shown in FIG. 2, a CPU operates based on the programs stored in the hard disk of this computer to realize the functions of the embodiments.

(Other Embodiments)

In the above embodiments, the printer shown in FIG. 2 uses the ink as a recording agent. However, the printer may use another recording agent such as a toner or the like. When the printer uses the toner, printing is performed in an electrostatic system.

Further, in the above embodiments, the L*a*b* color space is used. However, another color space such as an L*u*v* color space may be used.

(Seventh Embodiment)

In the first embodiment, when the color data conversion from the R, G and B data into the C, M, Y and K data is performed, the combination of the photograph matching table unit 101 and the photograph ink separation unit 103 performs the conversion in case of the photograph image, and the combination of the character/graphic matching table unit 102 and the character/graphic ink separation unit 104 performs the conversion in case of the character and graphic. In the seventh embodiment, it is proposed a method that, based on setting on the UI unit 106, a combination of the photograph matching table unit 101 and the character/graphic ink separation unit 104 can perform the conversion in case of the photograph image, and a combination of the character/graphic matching table unit 102 and the photograph ink separation unit 103 can perform the conversion in case of the character and graphic.

Figure 17:
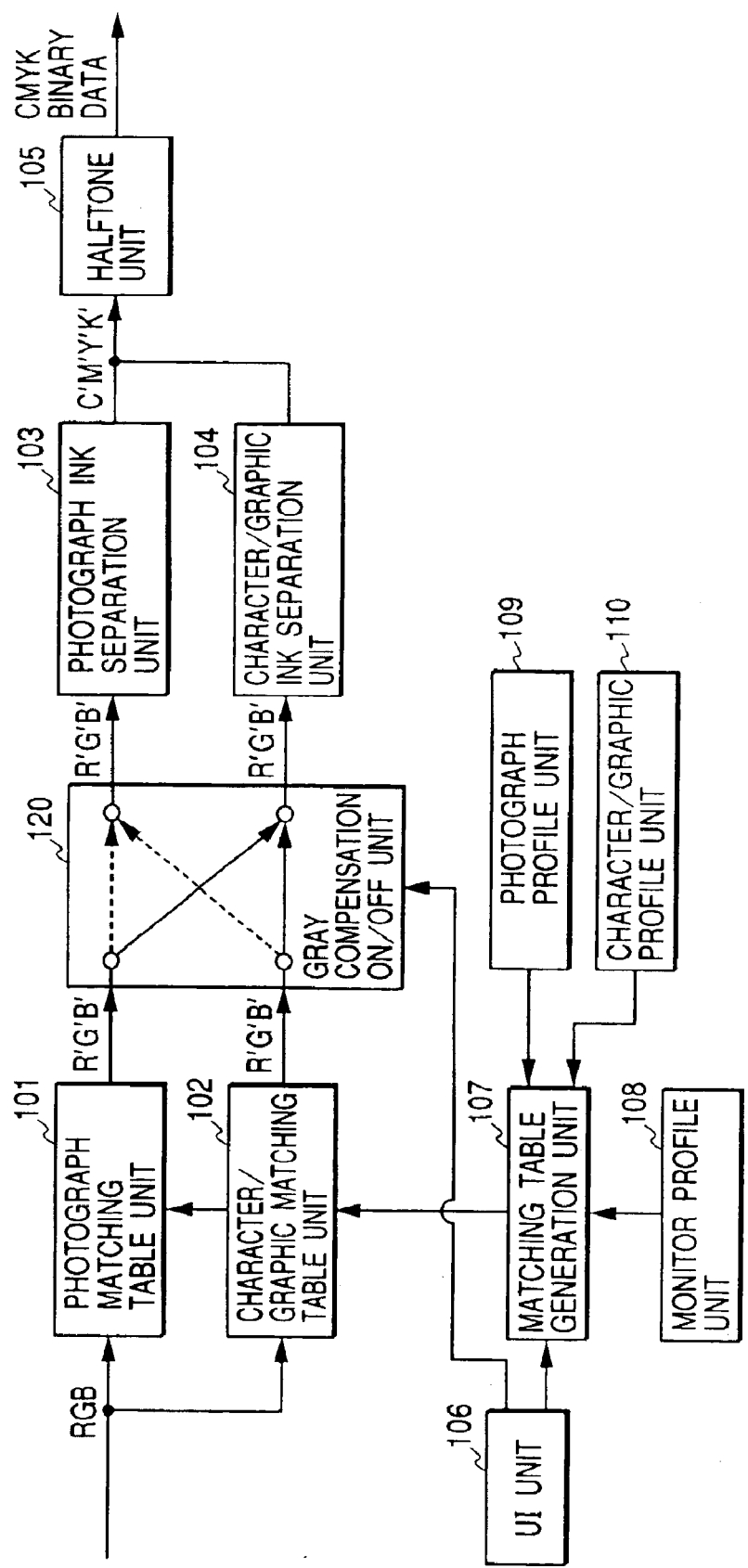
FIG. 17 is a block diagram showing a structure of the seventh embodiment.

FIG. 17 is a block diagram showing the structure of the seventh embodiment. In FIG. 17, numeral 101 denotes a photograph matching table unit, numeral 102 denotes a character/graphic matching table unit, numeral 103 denotes a photograph ink separation unit, numeral 104 denotes a character/graphic ink separation unit, and numeral 105 denotes a halftone unit. The halftone unit 105 performs processing to match the number of bits of input data with the number of bits manageable by the printer in a halftone method such as a dither method, an error diffusion method or the like. Numeral 106 denotes a UI unit by which a user selects a monitor profile, an image kind and a sheet. Numeral 107 denotes a matching table generation unit, numeral 108 denotes a monitor profile unit, and numeral 109 denotes a photograph profile unit. The photograph profile unit 109 stores profile data according to a corresponding sheet. Numeral 110 denotes a character/graphic profile unit which stores profile data according to a corresponding sheet. Numeral 120 denotes a gray compensation on/off unit which controls the combinations of the photograph matching table unit 101, the character/graphic matching table unit 102, the photograph ink separation unit 103 and the character/graphic ink separation unit 104, according to the setting from the UI unit 106. In the gray compensation on/off unit 120, a solid line represents a gray compensation on state, and a dotted line represents a gray compensation off state. As already explained in the first embodiment, the value $\mu\%$ is set to be 50% in the photograph ink separation unit 103, and the value $\mu\%$ is set to be 100% in the character/graphic ink separation unit 104, whereby a ratio of CMY process black and K ink black is set to be 1:1 in the photograph ink separation unit 103. Thus, as compared with a case of using only K ink, it is possible to realize a satisfactory and excellent gray line where rough feeling due to graininess can be suppressed. However, a change of the printer easily influences the gray line, and a slight tint easily appears in the gray line. On the other hand, since a gray line is reproduced only by K ink in the character/graphic ink separation unit 104, a change (C, M and Y inks) of the printer does not influence the gray line, and a slight tint does not appear in the gray line. However, it is impossible to realize the gray line where rough feeling due to graininess can be suppressed.

When the gray compensation is set to be on and the photograph is selected as the image kind on the UI unit 106, the generated R, G and B photograph image data are subjected to three-dimensional interpolation calculation processing based on the stored table in the photograph matching table unit 101. R', G' and B' data after the three-dimensional interpolation calculation processing are supplied to the character/graphic ink separation unit 104 through the gray compensation on/off unit 120, and the gray line is subjected to ink separation processing of only K ink. After then, processed data is binarized in the halftone unit 105, the binarized data is transferred to a printer engine, and printing is performed based on the transferred data. Thus, even in a printer state that gray is unbalanced because the change of the printer is large, it is possible to print the photograph in which the gray is stable. Further, when the character/graphic is selected in the image kind menu of the UI unit 106, the same processing as that in the first embodiment is performed.

When the gray compensation is set to be off and the character/graphic is selected as the image kind on the UI unit 106, the generated R, G and B character/graphic image data are subjected to the three-dimensional interpolation calculation processing based on the stored table in the character/graphic matching table unit 102. R', G' and B' data after the three-dimensional interpolation calculation processing are supplied to the photograph ink separation unit 103 through the gray compensation on/off unit 120, and the gray line is subjected to ink separation processing of the ratio of CMY process gray and K ink black being 1:1. After then, processed data is binarized in the halftone unit 105, the binarized data is transferred to the printer engine, and the printing is performed based on the transferred data. Thus, it is possible to realize the printing of satisfactory graininess even for the character and the graphic.

As explained above, in the present embodiment, it is possible to select the color separation of which UCR quantity is different according to user's liking.

Further, even if the change of the printer is large, it is possible to realize the printing that gray of the photograph image is not unbalanced. Further, it in is possible to realize satisfactory-graininess printing even for a gradation image (graphics) to which satisfactory and excellent graininess is required at its highlight portion, by using the CMY process gray.

What is claimed is:

1. An image processing apparatus comprising:
    color matching processing means for performing a color matching processing of mapping an input color signal into a color reproduction range of an output apparatus;
    color separation means for separating image data, subjected to the color matching processing, into color components corresponding to recording agents used by the output apparatus;
    setting means for setting a kind of input image;
    control means for controlling a method of the color matching processing and a method of the image data separation, according to the kind of input image set by said setting means;
    synthesis means for generating a lookup table by synthesizing output of said color matching means and said color separation means, both controlled by said control means; and
    image processing means for converting the input color signal using the generated lookup table.

2. An apparatus according to claim 1, wherein said control means sets a UCR (under color removal) quantity used by said color separation means, according to the kind of input image set by said setting means.

3. An apparatus according to claim 1, wherein said control means sets a UCR quantity used a kind of input apparatus, a profile corresponding to the kind of output apparatus, and a kind of a recording sheet used by the output apparatus.

4. An apparatus according to claim 1, wherein the kind of input image includes a photograph and a graphic.

5. An apparatus according to claim 1, wherein said image processing means performs a multidimensional interpolation processing.

6. An image processing method comprising:
    a color matching processing step, of performing a color matching processing of mapping an input color signal into a color reproduction range of an output apparatus;

a color separation step, of separating image data, subjected to the color matching processing, into color components corresponding to recording agents used by the output apparatus;

a setting step, of setting a kind of input image;

a control step, of controlling a method of the color matching processing and a method of the image data separation, according to the kind of input image set in said setting step;

a synthesis step, of generating a lookup table by synthesizing output of said color matching processing step and said color separation step, both controlled in said control step; and an image processing step, of converting the input color signal using the generated lookup table.

7. An image processing method comprising:

an obtaining step, of obtaining a color matching processing condition to realize color matching between a first apparatus and a second apparatus; and a generating step, of generating a multidimensional table based on the color matching processing condition obtained in said obtaining step, wherein the color matching processing condition of mapping a color reproduction range of the first apparatus to a color reproduction range of the second apparatus is obtained based on an equal-interval hue line of the Atlas of the Munsell Color System, wherein the color matching processing condition of each plural representative colors is independently obtained, and wherein the mapping condition concerning a color other than the plural representative colors is obtained based on the color matching processing condition obtained for the plural representative colors.

8. A method according to claim 7, wherein an achromatic-color target value is set for each of the plural representative colors, and the color matching processing condition is based on the achromatic-color target value.

9. A method according to claim 8, wherein the obtained color matching processing condition is set as the color matching processing condition used when a kind of input image is a photograph.

10. A method according to claim 8, wherein the plural representative colors are red, green, blue, cyan, magenta and yellow.

11. A method according to claim 7, wherein the color matching processing condition for one of the plural representative colors corresponding to a recording agent used in the second apparatus is obtained based on a reproduction line of the recording agent used in the second apparatus.

12. A storage medium which stores a program for executing an image processing method, said program comprising:

code for an obtaining step, of obtaining a color matching processing condition to realize color matching between a first apparatus and a second apparatus; and code for a generating step, of generating a multidimensional table based on the color matching processing condition obtained in said obtaining step, wherein the color matching processing condition of mapping a color reproduction range of the first apparatus to a color reproduction range of the second apparatus is obtained based on an equal-interval hue line of the Atlas of the Munsell Color System, wherein the color matching processing condition of each plural representative colors is independently obtained, and wherein the mapping condition concerning a color other than the plural representative colors is obtained based on the color matching processing condition obtained for the plural representative colors.

13. An image processing method of mapping an input color signal into a color reproduction range of an output device, said method comprising:

a providing step, of providing a hue line of the Atlas of the Munsell Color System;

a setting step, of setting a target color in regard to each of plural representative colors; and a mapping step, of mapping a color signal outside the color reproduction range of the output device into the color reproduction range by using the hue line of the Atlas of the Munsell Color System, provided in said providing step, and the target color set in said setting step, both corresponding to the color signal outside the color reproduction range of the output device.

14. A storage medium which stores a program for executing an image processing method of mapping an input color signal into a color reproduction range of an output device, said program comprising:

code for a providing step, of providing a hue line of the Atlas of the Munsell Color System;

code for a setting step, of setting a target color in regard to each of plural representative colors; and code for a mapping step, of mapping a color signal outside the color reproduction range of the output device into the color reproduction range by using the hue line of the Atlas of the Munsell Color System, provided in said providing step, and the target color set in said setting step, both corresponding to the color signal outside the color reproduction range of the output device.

15. An image processing apparatus comprising:

an obtaining unit adapted to obtain a color matching processing condition to realize color matching between a first apparatus and a second apparatus; and a generating unit adapted to generate a multidimensional table based on the color matching processing condition obtained by said obtaining unit;

wherein the color matching processing condition of mapping a color reproduction range of the first apparatus to a color reproduction range of the second apparatus is obtained based on an equal-interval hue line of the Atlas of the Munsell Color System, wherein the color matching processing condition of each plural representative colors is independently obtained, and wherein the mapping condition concerning a color other than the plural representative colors is obtained based on the color matching processing condition obtained for the plural representative colors.

16. An image processing apparatus for mapping an input color signal into a color reproduction range of an output device, said apparatus comprising:

a providing unit adapted to provide a hue line of the Atlas of the Munsell Color System;

a setting unit adapted to set a target color in regard to each of plural representative colors; and a mapping unit adapted to map a color signal outside the color reproduction range of the output device into the color reproduction range by using the hue line of the Atlas of the Munsell Color System, provided by said providing unit, and the target color set by said setting unit, both corresponding to the color signal outside the color reproduction range of the output device.

17. An image processing apparatus comprising:

a color matching processing unit adapted to perform a color matching processing of mapping an input color signal into a color reproduction range of an output apparatus;

a color separation unit adapted to separate image data, subjected to the color matching processing, into color components corresponding to recording agents used by the output apparatus;

a setting unit adapted to set a kind of input image;

a control unit adapted to control a method of the color matching processing and a method of the image data separation, according to the kind of input image set by said setting unit, a synthesis unit adapted to generate a lookup table by synthesizing output of said color matching unit and said color separation unit, both controlled by said control unit; and a image processing unit adapted to convert the input color signal using the generated lookup table.

* * * * *

UNITED STATES PATENT AND TRADEMARK OFFICE
CERTIFICATE OF CORRECTION

| | |
|---|---|
| PATENT NO. | : 6,897,988 B1 |
| DATED | : May 24, 2005 |
| INVENTOR(S) | : Kazuhiro Saito et al. |

It is certified that error appears in the above-identified patent and that said Letters Patent is hereby corrected as shown below:

<u>Title page,</u>
Item [56], References Cited, FOREIGN PATENT DOCUMENTS,
"405330148" should read -- 5-330148 --.
Item [*] Notice, "529 days." should read -- 589 days. --.

<u>Column 1,</u>
Line 9, "to" should read -- to an --;
Line 51, "the" should read -- a --; and
Line 65, "the" (first occurrence) should read -- a --.

<u>Column 5,</u>
Lines 29 and 30, "p %" should read -- µ % --.

<u>Column 7,</u>
Line 33, "are-used" should read -- are used --.

<u>Column 10,</u>
Line 66, "L*a* be" should read -- L*a*b --.

<u>Column 11,</u>
Line 53, "divides" should read -- divide --.

<u>Column 16,</u>
Lines 56-58, "used a kind of input apparatus, a profile corresponding to the kind of output apparatus, and a kind of a recording sheet used by the output apparatus." should read -- used by said color separation means, according to the kind of input image, set by said setting means, and a user's instruction. --.

<u>Column 17,</u>
Line 28, "each plural" should read -- each of the plural --; and
Line 66, "each plural" should read -- each of the plural --.

UNITED STATES PATENT AND TRADEMARK OFFICE
CERTIFICATE OF CORRECTION

PATENT NO. : 6,897,988 B1
DATED : May 24, 2005
INVENTOR(S) : Kazuhiro Saito et al.

It is certified that error appears in the above-identified patent and that said Letters Patent is hereby corrected as shown below:

<u>Column 18,</u>
Line 49, "each plural" should read -- each of the plural --.

<u>Column 20,</u>
Line 9, "a" should read -- an --.

Signed and Sealed this

Thirtieth Day of May, 2006

JON W. DUDAS
*Director of the United States Patent and Trademark Office*